United States Patent
Smith et al.

(10) Patent No.: US 8,936,482 B2
(45) Date of Patent: Jan. 20, 2015

(54) HIGH VOLTAGE SAFETY LOCK SENSING—SINGLE SENSOR LINEAR ACTUATOR

(71) Applicant: GM Global Technology Operations LLC, Detroit, MI (US)

(72) Inventors: Micah J. Smith, Warren, MI (US); Alisyn M. Malek, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 213 days.

(21) Appl. No.: 13/663,937

(22) Filed: Oct. 30, 2012

(65) Prior Publication Data

US 2013/0137286 A1    May 30, 2013

Related U.S. Application Data

(60) Provisional application No. 61/565,216, filed on Nov. 30, 2011.

(51) Int. Cl.
*H01R 13/26* (2006.01)
*H01R 13/436* (2006.01)
*B60L 11/18* (2006.01)

(52) U.S. Cl.
CPC ........ *H01R 13/4361* (2013.01); *B60L 11/1809* (2013.01)
USPC ............... 439/347; 439/372; 33/1 PT; 33/600

(58) Field of Classification Search
CPC ......................... H01R 13/4361; B60L 11/1809
USPC ............................ 439/347, 372; 33/1 PT, 600
See application file for complete search history.

(56) References Cited

U.S. PATENT DOCUMENTS

| | | | | |
|---|---|---|---|---|
| 5,218,769 A | * | 6/1993 | Tranchon | 33/1 PT |
| 5,627,448 A | * | 5/1997 | Okada et al. | 439/133 |
| 5,676,560 A | * | 10/1997 | Endo et al. | 439/310 |
| 5,751,135 A | * | 5/1998 | Fukushima et al. | 320/107 |
| 8,016,604 B2 | * | 9/2011 | Matsumoto et al. | 439/304 |
| 8,075,329 B1 | * | 12/2011 | Janarthanam et al. | 439/304 |

(Continued)

FOREIGN PATENT DOCUMENTS

| | | |
|---|---|---|
| CN | 2848771 Y | 12/2006 |
| CN | 102456989 A | 5/2012 |

(Continued)

OTHER PUBLICATIONS

Office Action regarding related CN App. No. 201210501631.2; dated Sep. 29, 2014; 7 pgs.

*Primary Examiner* — Christopher Fulton
(74) *Attorney, Agent, or Firm* — Cantor Colburn LLP

(57) ABSTRACT

A safety lock device for locking a charging connector in a charging receptacle of an electric vehicle is provided. The safety lock device includes a locking pin movable between a first position and a second position, an actuator configured to drive the locking pin between the first position and second position, a sensor configured to measure information used in determining a distance the actuator has driven the locking pin and a control unit electrically connected to the sensor and configured to receive the measured information from the sensor and determine the status of the safety lock based on the measured information received from the sensor. The charging connector and charging receptacle may be part of a Fast Charge coupler.

22 Claims, 1 Drawing Sheet

(56) References Cited

U.S. PATENT DOCUMENTS

| | | | |
|---|---|---|---|
| 8,262,402 B2 * | 9/2012 | Gaul et al. | 439/304 |
| 8,376,767 B2 * | 2/2013 | Kahara et al. | 439/304 |
| 8,460,028 B2 * | 6/2013 | Tormey et al. | 439/528 |
| 8,547,059 B2 * | 10/2013 | Kurumizawa et al. | 320/111 |
| 8,550,833 B2 * | 10/2013 | Martin | 439/310 |
| 8,758,039 B2 * | 6/2014 | Ishida et al. | 439/372 |
| 2010/0271192 A1 | 10/2010 | Mituta | |
| 2011/0300736 A1 * | 12/2011 | Katagiri et al. | 439/347 |
| 2012/0234061 A1 * | 9/2012 | Inoue et al. | 70/255 |
| 2012/0252251 A1 * | 10/2012 | Hirashita | 439/304 |
| 2013/0337669 A1 * | 12/2013 | Najera et al. | 439/133 |
| 2014/0167695 A1 * | 6/2014 | Shimizu et al. | 320/109 |
| 2014/0170879 A1 * | 6/2014 | Kahara et al. | 439/304 |
| 2014/0184158 A1 * | 7/2014 | Osawa et al. | 320/109 |

FOREIGN PATENT DOCUMENTS

| | | |
|---|---|---|
| CN | 102781715 A | 11/2012 |
| WO | 2011062004 A1 | 5/2011 |

* cited by examiner

HIGH VOLTAGE SAFETY LOCK SENSING—SINGLE SENSOR LINEAR ACTUATOR

CROSS-REFERENCES TO RELATED APPLICATIONS

This patent application claims priority to U.S. Patent Application Ser. No. 61/565,216 filed Nov. 30, 2011 which is hereby incorporated herein by reference in its entirety.

FIELD OF THE INVENTION

The subject invention relates to a safety lock device having a sensor to determine the condition of the safety lock device for a charging coupler, and in particular, a safety lock device for a Fast Charge charging coupler.

BACKGROUND

Electric vehicles may be charged by way of a charging coupler. A charging coupler may include a charging connector extending from a charging device and a charging receptacle in the electric vehicle configured to receive the charging connector. The electric vehicle may be charged by inserting the charging connector into the charging receptacle of the vehicle. However, charging times using a traditional charging coupler may be unsuitable.

To address this, a Fast Charge function has been developed. In the context of electric vehicles, the Fast Charge function refers to charging of the vehicle batteries using a higher voltage and current than traditional charging configurations. Here, the higher voltage and current are received via a Fast Charge coupler interfaced with the electric vehicle. However, due to the increased current flowing through the Fast Charge coupler, safety issues may arise if the Fast Charge connector is removed from the charging receptacle of the vehicle during a charging operation. For example, an operator may become exposed to the high current or arcing may occur, if the Fast Charge connector is removed during the charging operation.

Accordingly, it is desirable to provide a safety lock device having a sensor to determine the condition of a safety lock so as to prevent removal of the Fast Charge connector from the charging receptacle of the vehicle during a fast charging operation.

SUMMARY OF THE INVENTION

In one exemplary embodiment of the invention there is provided a safety lock device for locking a charging connector in a charging receptacle of an electric vehicle. The safety lock device comprises a locking pin movable between a first position and a second position, an actuator configured to drive the locking pin between the first position and second position, a sensor configured to measure information used in determining a distance the actuator has driven the locking pin and a control unit electrically connected to the sensor and configured to receive the measured information from the sensor and determine the status of the safety lock based on the measured information received from the sensor.

In another exemplary embodiment of the invention, there is provided a safety lock system comprising a safety lock device and a charging connector configured to be inserted in a charging receptacle of an electric vehicle. The charging connector includes an opening formed therein and the safety lock device includes a locking pin movable between a first position and a second position, an actuator configured to drive the locking pin between the first position and second position, a sensor configured to measure information used in determining a distance the actuator has driven the locking pin and a control unit electrically connected to the sensor and configured to receive the measured information from the sensor and determine the status of the safety lock based on the measured information received from the sensor.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
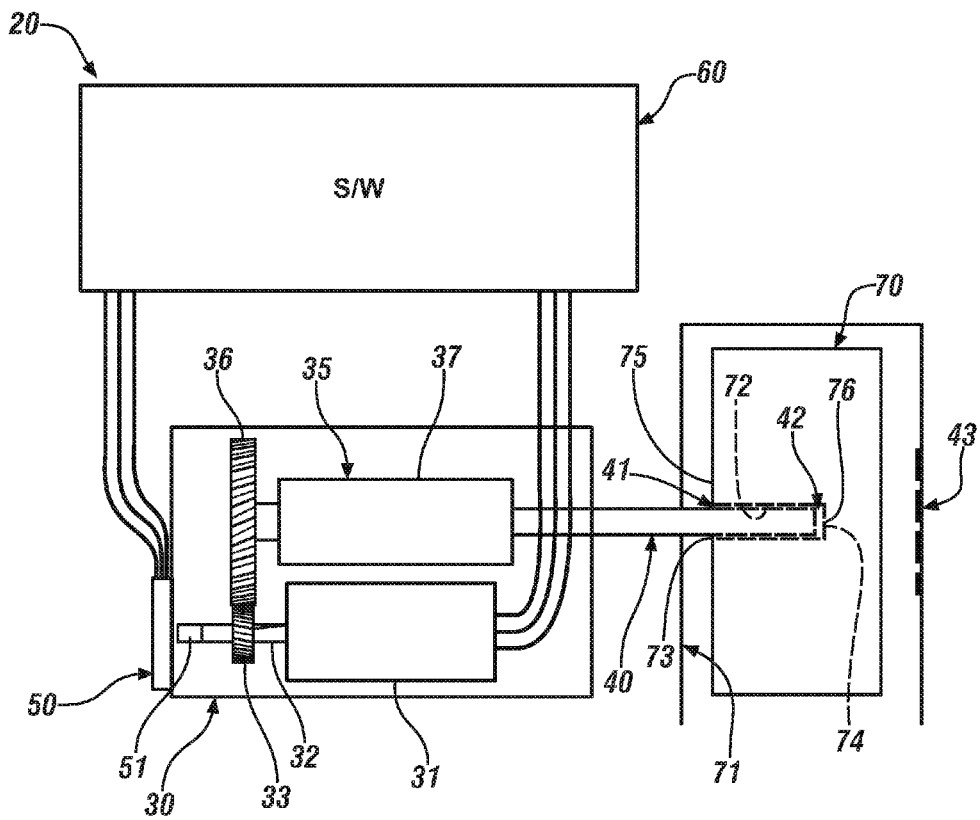
FIG. 1 schematically illustrates a safety lock device and charging coupler according to an exemplary embodiment of the present application.

The following description is merely exemplary in nature and is not intended to limit the present disclosure, its application or uses. It should be understood that throughout the drawings, corresponding reference numerals indicate like or corresponding part and features.

In accordance with an exemplary embodiment of the subject invention, and with reference to FIG. 1, the safety lock device 20 includes an actuator 30, locking pin 40, sensor 50 and control unit 60.

In one exemplary embodiment, the actuator 30 includes a motor 31, a shaft 32 and a gearing system 35. The motor 31 causes the shaft 32 to rotate. Rotation of the shaft 32 drives the gearing system 35. The gearing system 35 is configured to convert a rotational motion supplied from the shaft 32 into a linear motion such that the locking pin 40 is driven along a linear path by the gearing system 35.

The motor 31 may be an electric motor that is powered by any suitable power source, for example, a battery of a vehicle (not shown). However, the electric motor is described as a non-limiting example only, and it is understood that other suitable motors may be used as well.

With reference to the exemplary embodiment in FIG. 1, the shaft 32 includes a gear interface 33 mounted thereon. The gear interface 33 is configured to rotate with the shaft 32, and is connected to the gearing system 35 so as to drive the gearing system 35. That is, rotation of the shaft 32 causes the gear interface 33 to rotate therewith. The gear interface 33 is connected to the gearing system 35, for example, via a meshing engagement, so as to drive the gearing system 35.

With further reference to the exemplary embodiment in FIG. 1, the gearing system 35 includes a driven gear portion 36 driven by the gear interface 33, and a converting portion 37. The driven gear portion 36 is driven by the gear interface 33, for example, via a meshing engagement with the gear interface 33. The driven gear portion 36 is connected to the converting portion 37 in such a way that rotation of the driven gear 36 causes the converting portion 37 to move the locking pin 40 in a linear direction. That is, the converting portion 37 is configured to convert a rotational motion of the driven gear 36 into a linear motion of the locking pin 40.

In one exemplary embodiment, the converting portion 37 may include a series of gears that rotate due to the rotation of the driven gear 36. The locking pin 40 may include a rack portion meshingly engaged with one of the gears of the converting portion 37 such that rotation of the one gear causes the locking pin to move in a linear direction.

Alternatively, in another exemplary embodiment, the converting portion 37 may include a threaded shaft having first screw thread and the locking pin 40 having a second screw thread which is threadably engaged to the first screw thread. Rotation of the driven gear 36 causes rotation of the shaft having the first screw thread. The locking pin 40 is held against rotation relative to the first screw threads of the converting portion 37. The rotation of the threaded shaft, together with the threaded engagement between the first and second screw threads, causes the locking pin 40 to move in a linear direction. The threaded shaft may be connected directly to the driven gear 36 and rotate with the driven gear 36. Alternatively, at least one additional gear may be positioned between the driven gear 36 and the shaft.

It is understood that the embodiments of the converting portion 37 and locking pin 40 discussed above are provided for the purposes of example only and are not limiting. Other suitable configurations of the converting portion 37 and the locking pin 40, where rotation of a least a part of the converting portion 37 causes linear movement of the locking pin 40, are envisioned as well.

As detailed above, the locking pin 40 is configured to be driven along a linear travel path by the gearing system 35. The locking pin 40 travels between a first position 41 and a second position 42. In an exemplary embodiment, the first position 41 of the locking pin 40 corresponds to the safety lock device 20 being unlocked. The second position 42 corresponds to the safety lock device 20 being locked. In addition, the actuator 30 is configured to drive the locking pin 40 to a third position 43 beyond the first position 41 and second position 42.

A sensor 50 is positioned adjacent to the shaft 32 of the motor 31. In an exemplary embodiment, the sensor 50 may detect the rotation of the shaft 32 and measure the amount of rotation of the shaft 32. That is, the sensor 50 may measure the angle through which the shaft rotates. In one example, a permanent magnet 51 may be positioned on an end of the shaft 32. The sensor 50 is configured to detect the rotation of the shaft 32 by monitoring the position of the permanent magnet 51.

The sensor 50 may detect rotation of the shaft with a known degree of sensitivity. For example, the sensor 50 may detect rotation of the shaft 32 through every 1.5 degrees. It is understood, however, that the sensor 50 is not limited to this configuration, and may detect rotation of the through varying degrees of sensitivity depending on the particular application of the subject invention.

A control unit 60 is coupled with the sensor 50. The control unit 60 receives a signal from the sensor 50 indicating the angle through which the shaft has rotated. In an exemplary embodiment, the control unit 60 stores a "predetermined angle." Each rotation of the shaft 32 through the predetermined angle corresponds to a linear distance the actuator 30 is configured to drive the locking pin 40. The number of rotations of the shaft 32 through the predetermined angle may be determined by the control unit by dividing measured information from the sensor 50, i.e., the angle/amount of rotation measured by the sensor 50, by the predetermined angle. Accordingly, the control unit 60 may determine a distance traveled by the locking pin 40 based on the signal received from the sensor 50.

In the examples below, the predetermined angle is described as being 180 degrees. However, it is understood that different predetermined angles may be used based on a particular application of the subject invention. That is, the predetermined angle may be any angle that is suitable for a particular application of the subject invention. Reducing the predetermined angle may allow for more accurate measurement of the distance traveled by the locking pin 40.

In addition, the examples below refer to a distance the actuator 30 is configured to drive the locking 40 as being 1 mm for every 180 degrees of rotation by the shaft 32. However, it is understood that the distance the actuator 30 is configured to drive the locking pin 40 for each rotation of the shaft 32 through the predetermined angle may vary, based on a particular application. Thus, the predetermined angle and the distance the actuator 30 is configured to drive the locking pin 40 for each shaft 32 rotation through the predetermined angle are not limited to the examples described herein. For example, the actuator 30 may be configured to drive the locking pin 40 0.5 mm, 0.75 mm or 0.9 mm for every rotation of the shaft 32 through the predetermined angle. The predetermined angle and distance the actuator 30 is configured to drive the locking pin 40 for each rotation of the shaft 32 through the predetermined angle may be known and/or determined through testing and/or design.

The distance the actuator 30 is configured to drive the locking pin 40 may be determined by the following equation:

$$d = \Omega * r \qquad \text{Equation 1}$$

where:

'd' is the distance the actuator is configured to drive the locking pin;

'$\Omega$' is a number of rotations by the shaft through a predetermined angle; and 'r' is a linear distance the actuator is configured to drive the locking pin each time the shaft rotates through the predetermined angle.

Figure 2:
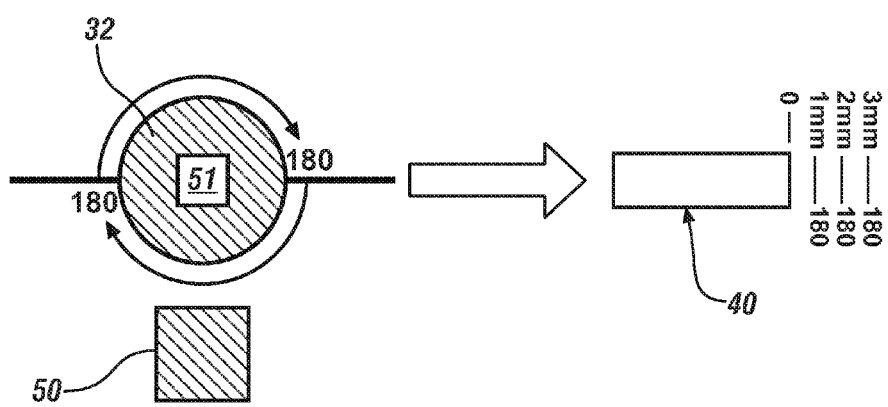
FIG. 2 illustrates a relationship between rotation of a shaft and a distance traveled by a locking pin according to an exemplary embodiment of the present application.

For example, and with reference to FIG. 2, it may be determined that the actuator is configured to drive the locking pin 1 mm as the shaft 32 rotates through a predetermined angle of 180 degrees, or 1 mm for every ½ turn of the shaft 32. Accordingly, when the sensor 50 senses the shaft 32 has made a complete rotation, i.e., two 180 degree turns, the control unit 60 may then calculate that the actuator has driven the locking pin 2 mm. Thus, when a starting position of the locking pin 40 is known, the current position of the locking pin 40 may be determined.

In the exemplary embodiments described above the distance the actuator drives the locking pin 40 and the position of the locking pin 40 may be determined by the control unit 60 based on input from a single sensor 50. That is, in the exemplary embodiments above, only a single sensor 50 is needed to monitor and measure the rotation of the shaft 32. This information, together with other known information may be used by the control unit 60 to determine the distance the locking pin 40 is driven by the actuator 30 and the position of locking pin 40. By using only a single sensor, the packaging size, weight, complexity and cost of the safety lock device 20 may be reduced or minimized.

The safety lock device 20 may be used with a charging coupler, and in particular, a Fast Charge connector 70 and Fast Charge receptacle 71 of a Fast Charge system for charging an electric vehicle. A Fast Charge system decreases the charging time of the vehicle by using a higher current than traditional charging systems. Accordingly, the safety lock device 20 may be used to maintain the Fast Charge connector 70 in its proper position during charging so as to prevent or reduce the likelihood of removal of the Fast Charge connector from a charging receptacle of the vehicle while charging.

With further reference to FIG. 1, the charging connector 70 interfaces with a corresponding charging receptacle 71 of the vehicle when in a charging condition. The charging connector 70 further includes an opening 72 configured to receive the locking pin 40 of the safety lock device 20.

The opening 72 of the charging connector 70 generally includes a first end 73 and a second end 74. In an exemplary embodiment of the present invention, the first end 73 refers to an outer end of the opening 72 generally proximate to an outer surface of the charging coupler 70. The second end 74 refers to an inner end of the opening 72, where the receptacle 72 terminates. An outer hard stop surface 75 is formed on an outer surface of the charging connector 70. An inner hard stop surface 76 is formed at the second end 74 of the opening 72. A hard stop surface refers to a surface, that when contacted by the locking pin 40 prevents or limits further movement of the locking pin 40 in the direction of the hard stop surface.

The first position 41 of the locking pin 40 corresponds to a position outside of the opening 72. The second position 42 of the locking pin 40 corresponds to a position at the inner hard stop surface 76 at the second end 74 of the opening 72.

The third position of the locking pin 40, which corresponds to a fully extended position of the locking pin 40, is positioned beyond the second end 74 of the opening 72. However, when the charging connector 70 is inserted in the charging receptacle 71 of the vehicle and is in a charging state, the inner hard stop surface 76 at the second end of the opening 72 prevents the locking pin 40 from fully extending to the third position 43.

When the locking pin 40 is extended to the inner hard stop surface 76 of the second end 74 of the opening 72, i.e., the second position 42, the safety lock device 20 is in a locked state. At any other position between the first position 41 and second position 42, the locking pin 40 is considered to be in an unlocked state.

In operation, when a charging coupler 70 is inserted into a charging receptacle 71 of a vehicle and is in a charging condition, the safety lock device 20 is activated. The shaft 32 of the motor 31 rotates. Rotation of the shaft 32 drives the gearing assembly 35. The gearing assembly 35 converts the rotational motion from the shaft 32 into a linear motion of the locking pin 40. The locking pin 40 is then moved along a linear travel path and received in the opening 72 of the charging connector 70. The locking pin 40 travels to the inner hard stop surface 76 at the second end 74 of the opening 72 and locks the charging connector 70 in the charging receptacle of the vehicle.

As detailed above, the distance traveled by the locking pin 40 for a predetermined amount of rotation by the shaft 32 is known. In addition, the maximum distance the locking pin 40 can travel, i.e., to the third position, and the drive time it takes to reach the third position is known. This distance refers to a distance the actuator 30 may drive the locking pin 40 if movement of the locking pin 40 is not obstructed by any hard stop surface. Further, the distance for the locking pin 40 to travel from the first position 41 to the inner hard stop surface 76 at the second end 74 (i.e., the second position 42) of the opening 72 is known. As discussed above, this distance corresponds to the locked state of the locking pin 40 and is less than the maximum distance the locking pin 40 can travel.

The sensor 50 measures a rotation of the shaft 32 through an angle and transmits the measured angle to the control unit 60. Based on a known predetermined angle and the measured information, i.e., the measured angle, received from the sensor 50, the control unit 60 calculates a number of times the shaft 32 rotates through the predetermined angle. The control unit 60, using the information detailed above may then determine if the safety lock device 20 is in the locked state or unlocked state.

Further, the locking pin 40 may be damaged and/or broken away from the safety lock device 20 during use. The control unit 60 may further determine if the locking pin 40 exists based on the known data and data received from the sensor 50. These determinations maybe made as follow:

'x' is the maximum unobstructed distance the locking pin can travel;

'z' is the distance for the locking pin to travel to the locked state;

'r' is the distance the actuator is configured to drive the locking pin for each rotation of the shaft through a predetermined angle; and 'Ω' is the number of rotations through the predetermined angle When the number of rotations through the predetermined angle 'Ω' multiplied by the distance the locking pin travels for each rotation of the shaft 32 through the predetermined angle 'r' is equal to the distance for the locking pin 40 to travel from the first position 41 to the second position 42, the control unit 60 determines that the locking pin 40 exists and the safety lock device 20 has locked the charging connector 70 in the charging receptacle 71 of the vehicle. That is, when this condition is met, the control unit 60 determines the safety lock device 20 is in the locked state. This may be expressed as:

if $$z = \Omega * r \qquad \text{Equation 2}$$

then the control unit determines locking pin exists and is in the locked state;

When the number of rotations through the predetermined angle 'Ω' multiplied by the distance the locking pin 40 travels for each rotation of the shaft through the predetermined angle 'r' is less than the distance for the locking pin 40 to travel from the first position 41 to the second position 42, i.e., to the locked state, the control unit 60 determines that the locking pin 40 is not in a locked state and thus, the safety locking device 20 has not locked the charging connector 70 in the charging receptacle 71 of the vehicle. This may be expressed as:

if $$z > \Omega * r \qquad \text{Equation 3}$$

then the control unit determines the locking pin is not in the locked state;

Further, if the number of rotations through the predetermined angle 'Ω' multiplied by the distance the locking pin 40 travels for each rotation of the shaft 32 through the predetermined angle 'r' equals the distance 'x' from the first position 41 to the third position 43, then the control unit 60 determines that the locking pin 40 does not exist. This is because when the charging connector 70 is inserted into the charging receptacle, and is in a charging condition, the locking pin 40 may not travel any further than the distance 'z' from the first position to the second position 42 which corresponds to the locking condition. However, because the maximum distance 'x' the actuator 30 can drive the locking pin 40 is greater than the distance 'z' to the locking state, the shaft 32 may only rotate through the predetermined angle more times than necessary to move the locking pin the distance 'z' when the locking pin 40 is not present. This may be expressed as:

if $$x = \Omega * r \qquad \text{Equation 4}$$

then the control unit determines that the locking pin does not exist;

Alternatively, the control until 60 may determine the locking pin 40 does not exist if the number of rotations of the shaft 32 through the predetermined angle 'Ω' multiplied by the distance the locking pin 40 travels for each rotation of the shaft 32 through the predetermined angle 'r' is greater than the distance 'z'.

The control unit 60 may interface with a display device (not shown) that alerts an operator of the vehicle to the current state of the safety lock device 20. The display device may be, for example, an indicator light on the safety lock device or the charging connector 70. Alternatively, the display device may be an indicator light or other indicia displayed within the vehicle.

When it is determined that the safety lock device 20 is in an unlocked condition or the locking pin 40 does not exist or is otherwise non-functional, Fast Charging is prohibited. In such conditions, the operator may safely remove the charging connector 70 from the charging receptacle of the vehicle.

An example of the operation of the control unit 60 is described below. In an example where the predetermined angle is 180 degrees, x=4 mm, and r=1 mm/180 degrees, the number of rotations through the 180 degree angle 'Ω' to reach the maximum travel distance 'x' of the locking pin is 4. Further, the distance for the locking pin to travel to the locked state 'z' is 3 mm.

Accordingly, if the sensor 50 measures that the shaft 32 has rotated through, for example, 360 degrees, the control unit 60 determines that the shaft 32 has rotated through the predetermined angle (180 degrees in this example) twice, and that Ω*r=2. Because the distance to the locking state 2<z, the control unit 60 determines that that the safety locking device 20 is unlocked and the charging connector 70 is not locked in the charging receptacle 71 of the vehicle. The control unit 60 transmits a corresponding alert to the display to alert an operator of this condition.

Alternatively, if the sensor 50 measures that the shaft 32 has rotated through, for example, 540 degrees, the control unit 60 determines that the shaft 32 has rotated through the predetermined angle three (3) times, and that Ω*r=3. Because z=3, the control unit 60 determines that the locking pin 40 is in the locked state, and thus, the charging connector 70 is locked in the charging port by the safety lock device 20.

In yet another scenario, if the sensor 50 measures that the shaft 32 has rotated through 720 degrees, the control unit 60 determines that the shaft 32 has rotated through the predetermined angle four (4) times, and that Ω*r=4. Because x=4, and this distance exceeds the distance the locking pin 40 could travel with the charging connector 70 in the charging receptacle 71, the control unit 60 determines that the locking pin 40 does not exist. Accordingly, the control unit 60 transmits an alert to the display to alert the operator of this condition.

It is understood that these examples are non-limiting and are provided simply to add clarity to the description. Different values for the distances and predetermined angle are also envisioned.

In an exemplary embodiment, the control unit 60 may be a computer and/or a microprocessor. The control unit 60 includes a computer readable storage medium configured to store program instructions configured to carry out the methods described herein. The control unit 60 may further include an I/O interface configured to operably communicate with external components.

The exemplary embodiments described above refer to a sensor 50 which measures the rotation of the shaft 32. However, it is understood that this sensor 50 is described for the purposes of example only, and is non-limiting. Other sensors are envisioned for use in the safety lock device 20 of the subject invention. For example, a small switch, such as a microswitch may be positioned at a hard stop surface to detect when the locking pin 40 comes into contact with the hard stop surface.

In another exemplary embodiment, a potentiometer may be linked to the locking pin 40 at a position inside the actuator 30. The potentiometer may measure the distance traveled by the locking pin 40. By measuring the distance traveled, the position of the locking pin 40 may be determined.

In still another exemplary embodiment, a hall effect sensor may be used outside of the actuator 30 and operate in conjunction with a magnet positioned on the locking pin 40. A hall effect sensor may include two sensors and may determine the position of the magnet moving between the two sensors. Thus, the position of the locking pin 40 with the magnet positioned thereon may be determined.

In yet another exemplary embodiment, a combination of switches may be used. For example, switches may be positioned at a location inside of the actuator 30 and outside of the actuator 30. The switches may be actuated by movement of the locking pin 40. Accordingly, the position of the locking pin 40 may be determined based on the actuation of the switches.

It is understood that these exemplary embodiments are non-limiting. Additional sensor arrangements are envisioned to measure the position of the locking pin 40, including, but not limited to, combinations of the sensor arrangements described in the exemplary embodiments above.

The safety lock device 20 described herein may be used in conjunction with numerous charging couplers including Fast Charge couplers. For example, the safety lock device may be used in conjunction with IEC 62196-3 Type 2 Combo standard inlet/connector, which is the European Fast Charge coupler interface.

While the invention has been described with reference to the exemplary embodiments, it will be understood by those skilled in the art that various changes may be made and equivalents may be substituted for elements thereof without departing from the scope of invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A safety lock device for locking a charging connector in a charging receptacle of an electric vehicle, the safety lock device comprising:
    a locking pin movable between a first position and a second position;
    an actuator configured to drive the locking pin between the first position and second position;
    a sensor configured to measure information used in determining a distance the actuator has driven the locking pin; and
    a control unit electrically connected to the sensor and configured to receive the measured information from the sensor and determine the status of the safety lock based on the measured information received from the sensor.

2. The safety lock of claim 1, wherein the actuator comprises:

a motor having a rotating shaft; and a gear assembly driven by the shaft of the motor, the gear assembly connected to the locking pin and configured to drive the locking pin between the first position and the second position.

3. The safety lock of claim 2, further comprising:

a magnet positioned on an end of the shaft of the motor;

wherein the sensor is an angle sensor positioned adjacent to the magnet and the information measured is an angle through which the shaft rotates, measured by sensing rotation of the magnet on the shaft.

4. The safety lock of claim 2, wherein the shaft of the motor includes a gear interface rotatable with the shaft, the gear interface driving the gear assembly upon rotation of the shaft.

5. The safety lock of claim 2, wherein the motor is an electric motor.

6. The safety lock of claim 1, wherein the control unit determines the status of the safety lock by calculating a number of times the shaft has rotated through a predetermined angle based on the measured information received from the sensor, and comparing a value calculated based on the calculated number of times the shaft has rotated through the predetermined angle to a known value.

7. The safety lock of claim 6, wherein the locking pin is configured to be received by an opening of a charging connector during movement from the first position toward the second position.

8. The safety lock of claim 7, wherein the control unit determines the status of the safety lock as being locked when the value calculated based on the number of times the shaft has rotated through the predetermined angle is a distance that corresponds to a distance between the first position and the second position.

9. The safety lock of claim 7, wherein the control unit determines the status of the safety lock as being unlocked when the value calculated based on the number of times the shaft has rotated through the predetermined angle is a distance that is less than a distance between the first position and the second position.

10. The safety lock of claim 7, wherein the control unit determines the status of the safety lock as unlocked and that the pin does not exist when the value calculated based on the number of times the shaft has rotated through the predetermined angle is a distance that is greater than a distance between the first position and the second position.

11. The safety lock of claim 7, wherein the charging connector and charging receptacle are part of a Fast Charge coupler.

12. A safety lock system comprising a safety lock device and a charging connector configured to be inserted in a charging receptacle of an electric vehicle, the charging connector having an opening formed therein, the safety lock device comprising:

a locking pin movable between a first position and a second position;

an actuator configured to drive the locking pin between the first position and second position;

a sensor configured to measure information used in determining a distance the actuator has driven the locking pin; and a control unit electrically connected to the sensor and configured to receive the measured information from the sensor and determine the status of the safety lock based on the measured information received from the sensor.

13. The system of claim 12, wherein the actuator comprises:

a motor having a rotating shaft; and a gear assembly driven by the shaft of the motor, the gear assembly connected to the locking pin and configured to drive the locking pin between the first position and the second position.

14. The system of claim 13, further comprising:

a magnet positioned on an end of the shaft of the motor;

wherein the sensor is an angle sensor positioned adjacent to the permanent magnet and the information measured is an angle through which the shaft rotates, measured by sensing rotation of the magnet.

15. The system of claim 13, wherein the shaft of the motor includes a gear interface rotatable with the shaft, the gear interface driving the gear assembly upon rotation of the shaft.

16. The system of claim 13, wherein the motor is an electric motor.

17. The system of claim 12, wherein the control unit determines the status of the safety lock by calculating a number of times the shaft has rotated through a predetermined angle based on the measured information received from the sensor, and comparing a value calculated based on the calculated number of times the shaft has rotated through the predetermined angle to a known value.

18. The system of claim 17, wherein the locking pin is configured to be received by the opening of the charging connector during movement from the first position toward the second position.

19. The system of claim 18, wherein the control unit determines the status of the safety lock as being locked when the value calculated based on the number of times the shaft has rotated through the predetermined angle is a distance that corresponds to a distance between the first position and the second position.

20. The system of claim 18, wherein the control unit determines the status of the safety lock as being unlocked when the value calculated based on the number of times the shaft has rotated through the predetermined angle is a distance that is less than a distance between the first position and the second position.

21. The system of claim 18, wherein the control unit determines the status of the safety lock as unlocked and that the pin does not exist when the value calculated based on the number of times the shaft has rotated through the predetermined angle is a distance that is greater than the a distance between the first position and the second position.

22. The system of claim 12, wherein the charging connector and charging receptacle are part of a Fast Charge coupler.

* * * * *